UNITED STATES PATENT OFFICE.

RUDOLF JOHANN MARIA SOMMER, OF VIENNA, AUSTRIA-HUNGARY, ASSIGNOR TO THE FIRM OF FRANZ FRITZSCHE & CO., OF HAMBURG-UHLENHORST, GERMANY.

PROCESS OF MAKING PROTOCATECHUIC ALDEHYDE.

No. 804,682.     Specification of Letters Patent.     Patented Nov. 14, 1905.

Application filed August 15, 1904. Serial No. 220,851.

*To all whom it may concern:*

Be it known that I, RUDOLF JOHANN MARIA SOMMER, professor, a subject of the Emperor of Austria-Hungary, and a resident of Währingerstrasse 59, in the city of Vienna, Austria-Hungary, have invented new and useful Improvements in the Manufacture of Protocatechuic Aldehyde, of which the following is a specification.

This invention relates to the manufacture of protocatechuic aldehyde intended to be used as raw material in the manufacture of vanillin and other chemicals.

According to a scientific publication heliotropin with hydrochloric acid of one per cent. gives when heated to a temperature of 200° centigrade protocatechuic aldehyde, carbon being at the same time separated. At a pressure of fourteen atmospheres—that is to say, at a temperature of about 195° to 200° centigrade—heliotropin begins to be carbonized; but nevertheless no extraction of protocatechuic aldehyde on a large scale is possible, only traces of it unfit for any technical purpose being obtained. It has been found that dilute acids, which, however, can be replaced by solutions of acid salts, such as bisulfates, bisulfites, or chlorids of metals, at twelve atmospheres—that is to say, at about 185° to 190° centigrade—and at a lower pressure or temperature easily produce the decomposition of heliotropin into protocatechuic aldehyde, so that nearly the whole theoretical yield is obtained.

For carrying out the process based on the above heliotropin is heated, say, with hydrochloric acid of one per cent., the whole being continually stirred, without exceeding a pressure of twelve atmospheres or a temperature of 190° centigrade.

Example: Forty parts of heliotropin, eight hundred parts of water, and twenty parts of merchantable hydrochloric acid are heated for three and one-half hours at five atmospheres (150° centigrade) and give twenty parts of protocatechuic aldehyde and 17.2 parts of heliotropin. The proportion of protocatechuic aldehyde extracted can be further increased by carrying out the process with heliotropin in solution. Thus, for instance, heliotropin may be dissolved in hydrocarbons or in alcohol, and the reagents specified are then applied. The decomposition of the heliotropin with water in the presence of acid is shown by the following equation:

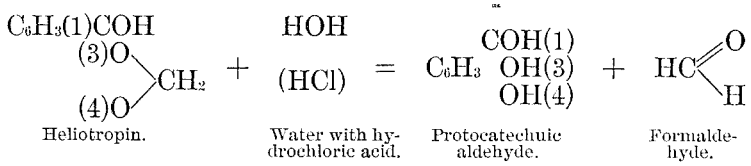

Heliotropin.     Water with hydrochloric acid.     Protocatechuic aldehyde.     Formaldehyde.

It has been found that specially-favorable results are obtained by using bisulfites, in presence of which water acts as a solvent. For instance, ten kilograms of heliotropin are heated with one hundred and forty liters of water and fourteen kilograms of bisulfite of sodium in an autoclave, as stated above. In order to separate the protocatechuic aldehyde, either the greater volatility of heliotropin is utilized by blowing off the heliotropin from the product of reaction after neutralization and by extracting protocatechuic aldehyde by evaporation, or the product of reaction is neutralized and heliotropin is extracted by means of ethers, and then after acidulating the protocatechuic aldehyde is finally extracted. The decomposition of the heliotropin combined with sodium bisulfite with water, wherein the bisulfite acts as an acid agent, is shown in the following equation:

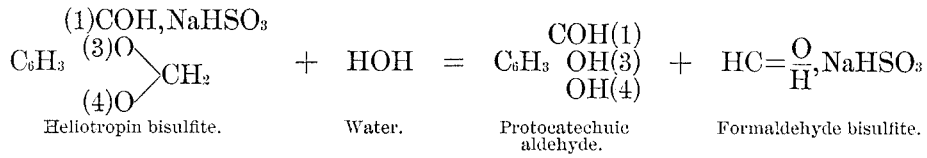

Heliotropin bisulfite.     Water.     Protocatechuic aldehyde.     Formaldehyde bisulfite.

Or the protocatechuic aldehyde may be precipitated after neutralization by means of salts of lead from which it is liberated, say, by sulfureted hydrogen, and finally obtained by evaporation from the water solution.

Protocatechuic aldehyde thus obtained forms a cheap raw material for the manufacture of vanillin and other chemical compounds.

Having thus described my invention, I claim—

1. The process of manufacturing protocatechuic aldehyde, which consists in heating heliotropin with an acid agent in the presence of water under a pressure not exceeding twelve atmospheres and under a temperature not exceeding 190° centigrade, substantially as described.

2. The process of manufacturing protocatechuic aldehyde, which consists in heating heliotropin in the presence of water and an acid salt as bisulfite of sodium under a pressure not exceeding twelve atmospheres and under a temperature not exceeding 190° centigrade, substantially as described.

3. The process of manufacturing protocatechuic aldehyde, which consists in heating heliotropin with an excess of bisulfite of sodium, and an excess of water under a pressure not exceeding twelve atmospheres and under a temperature not exceeding 190° centigrade, and separating the protocatechuic aldehyde from the resulting product, substantially as described.

4. The process of manufacturing protocatechuic aldehyde, which consists in dissolving heliotropin, mixing it with an acid agent and water, and heating the mixture under a pressure not exceeding twelve atmospheres, and under a temperature not exceeding 190° centigrade, substantially as described.

5. The process of manufacturing protocatechuic aldehyde, which consists in dissolving heliotropin, mixing the solution with sodium bisulfite, and a large excess of water, heating the mixture under a pressure not exceeding twelve atmospheres, and under a temperature not exceeding 190° centigrade, substantially as described.

6. The process of manufacturing protocatechuic aldehyde, which consists in dissolving heliotropin in alcohol, mixing the solution with an excess of bisulfite of sodium and a large excess of water, heating the mixture under a pressure not exceeding twelve atmospheres, and under a temperature not exceeding 190° centigrade, and separating the protocatechuic aldehyde from the resulting product, substantially as described.

In testimony whereof I have signed my name to this specification in the presence of two subscribing witnesses.

RUDOLF JOHANN MARIA SOMMER.

Witnesses:
ERICH BADERLE,
ALOIS FISCHER.